Nov. 16, 1965 H. L. REINSMA 3,218,107
SEAL AND COUPLING ASSEMBLY FOR A HINGED JOINT
Original Filed April 2, 1962
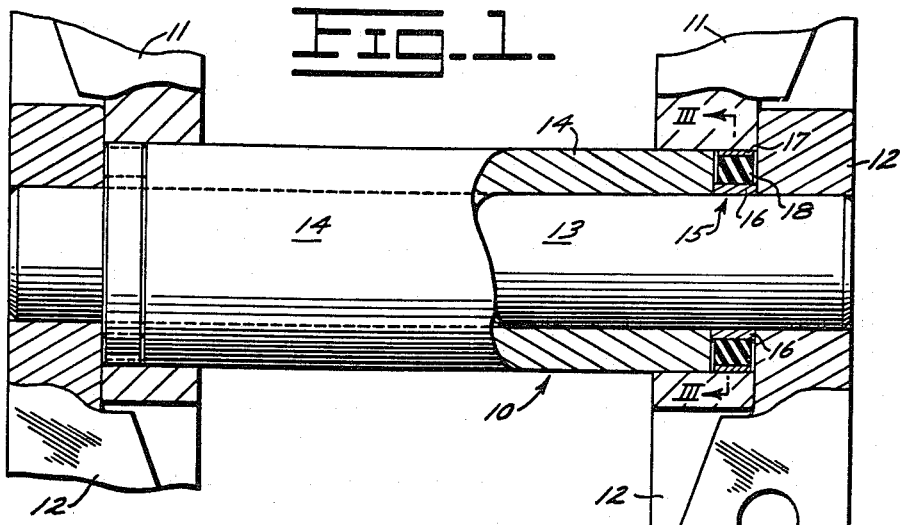
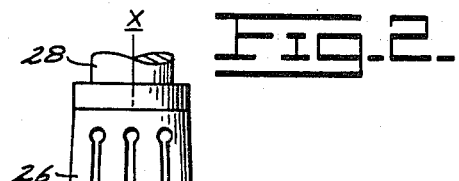
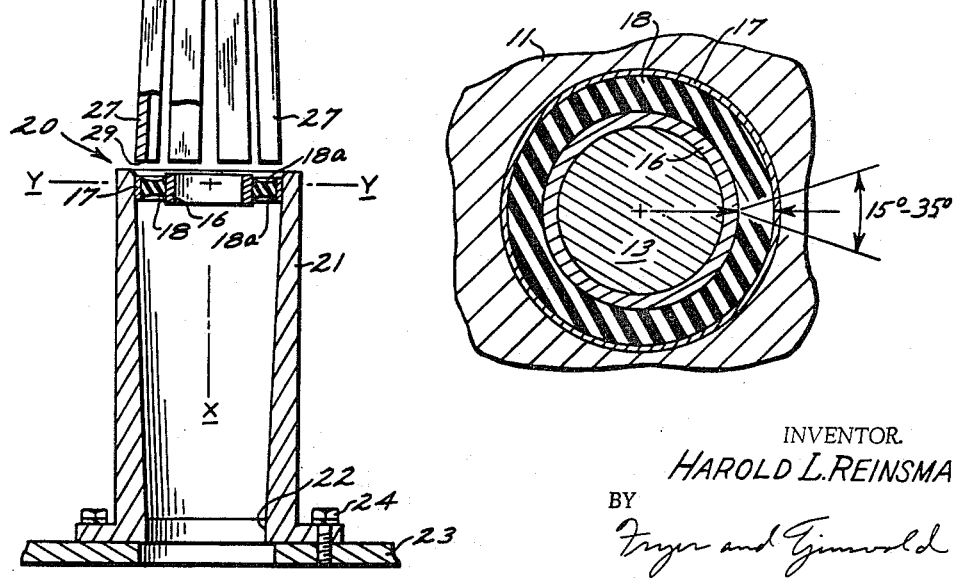
INVENTOR.
HAROLD L. REINSMA
BY
Fryer and Timmold
ATTORNEYS United States Patent Office 3,218,107
Patented Nov. 16, 1965

3,218,107
SEAL AND COUPLING ASSEMBLY FOR A HINGED JOINT
Harold L. Reinsma, Peoria, Ill., assignor to Caterpillar Tractor Co., Peoria, Ill., a corporation of California
Original application Apr. 2, 1962, Ser. No. 184,434, now Patent No. 3,158,923, dated Dec. 1, 1964. Divided and this application Feb. 28, 1964, Ser. No. 348,076
3 Claims. (Cl. 305—11)

This invention relates to a seal and coupling assembly for a hinged joint and more particularly relates to a seal and coupling assembly which may be used to afford limited pivotal movement at the hinged joint connections of an endless track mechanism of the type commonly employed on track-type tractors and the like. This application is a divisional application of U.S. patent application Serial No. 184,434 for "A Method for Making a Seal and Coupling Assembly," filed April 2, 1962.

Track mechanisms for track-type tractors conventionally comprise a plurality of ground-engaging track shoes secured to pairs of spaced track links. The adjacent track links are pivotally connected together by suitable hinged joints to form two spaced apart and endless chain drives. The chain drives thus formed are trained about suitable driving sprockets and idlers mounted on the tractor and support the tractor through the mechanism of the track rollers.

Such aforedescribed track mechanisms are generally subjected to extremely heavy loads and must operate in environments which contain a considerable amount of abrasive contaminants, such as dust. These contaminants often times produce a rapid deterioration of the hinged joints which operatively connect the adjacent track links. Thus, frequent repair or replacement of the deteriorated elements of the track mechanism is necessitated.

Attempts have been made to prevent such contaminants from entering such hinge connections while yet maintaining the desired track mechanism integrity and efficiency. For example, the "Sealing and Spacing Means for Hinge Connections" as disclosed in Patent No. 2,699,974 to John L. Deffenbaugh and the "Combined Seal and Thrust Means" which is disclosed in Patent 3,050,346 to Fred E. Simpson et al., have provided substantial improvements in this area. In particular, the above-mentioned devices, as well as this invention, primarily afford a protection to selected mating surfaces of the hinged connections which are arranged for limited rotation relative to each other. Although it is desirable to provide a seal assembly which will prevent such contamination, it is further desirable that such seal assembly will also afford substantial freedom of pivotal movement between the interrelated track links.

In accordance with the above discussions, this invention provides an improved seal and coupling assembly. In particular, the novel aspects of this invention essentially provide a hinged joint having a seal and coupling assembly uniquely arranged therein comprising an inner sleeve member, an outer sleeve member and an elastic means precompressed therebetween. The seal and coupling assembly provides a closely toleranced assembly which prevents the entry of abrasives into the hinged joint while yet providing substantially unrestricted freedom of pivotal movement therein.

An object of this invention is to provide a seal and coupling assembly for a hinged joint which prevents the passage of abrasive material therein while yet providing for substantially unrestricted freedom of pivotal movement thereof.

A further object of this invention is to provide a seal and coupling assembly for a hinged joint which is durable and efficient in construction and operation and substantially increases the life expectancy of the hinged joint.

These and other objects and advantages of this invention will become apparent from the following description taken in connection with the accompanying drawings in which:

FIG. 1 is a partially sectioned plan view disclosing a hinged joint portion of an endless track mechanism employing the novel seal assembly aspects of this invention;

FIG. 2 is a partially sectioned elevational view disclosing an apparatus which may be used to carry forth the method steps necessary to make the seal assembly employed in the hinged joint of FIG. 1, and FIG. 3 is a cross-sectional view taken on line III—III in FIG. 1.

FIG. 1 discloses a typical track portion 10 of an endless track mechanism of the type used on track-type tractors and the like. The track portion 10 is typical of the remaining portions substituting the track mechanism and comprises pairs of spaced apart pivotal track links 11 and 12. The individual track links are constructed and arranged to form hinge connections with the adjacent track links to afford limited pivotal movements therebetween, about the central longitudinal axis of pin member 13. The links are continuously connected in a like manner to provide two spaced apart and endless chain drives (not fully shown). The chain drives thus formed are adapted to have a plurality of ground-engaging track shoes (not shown) secured therebetween and on the outer peripheries thereof, in the manner hereinbefore described.

The links 12 are press-fitted onto the outer extremities of pin 13 so as to be maintained in secured relationship thereon during all relative movements of the track mechanism. A bushing 14 is rotatably mounted on pin 13 and secured to link 11 in press-fit relationship. A substantially closed annular chamber is thus formed by means of the links and the bushing in order to retain a seal assembly 15 therein.

The seal assembly 15 constitutes an inner sleeve member 16, an outer sleeve member 17 and an intermediate elastic ring member 18 which is securely maintained therebetween. The sleeve 16 preferably comprises a hardened steel constituent which will fulfill its requirements as a thrust absorber and spacer. It is further generally desired that the inside diameter thereof not be substantially varied when the seal assembly is being formed. As will be hereinafter more fully understood, the method of this invention aids in the achievement of this desiderata. The sleeve 17 preferably comprises a metallic constituent, such as low carbon steel or aluminum, which may be easily deformed, but is also capable of retaining its shape after such deformation.

The elastic ring member 18 may comprise any one of those classes of polymerized compounds characterized by elastic, rubber-like properties, such as the synthetic rubbers, natural rubbers and various plastics. As more clearly shown in FIG. 2, the ring member 18 is preferably bonded into pre-assembled relationship with the sleeve members in a conventional manner, such as by vulcanizing or the like, before it is finally formed. As also clearly shown in FIG. 2, the exposed surface portions 18a of the ring member may be preformed with indentations, preferably of concave configuration, in order to accommodate for the expansion of the ring member in that direction into substantially flush relationship with the edge portions of outer sleeve member 17.

Sleeve 16 is preferably press-fitted or otherwise secured onto pin 13 and sleeve 17 into link 11. Thus, link 11, bushing 14 and sleeve 17 are secured together and are adapted for limited pivotal movements about the longitudinal axis of pin 13, relative to the pivotal movements of link 12, pivot pin 13 and sleeve 16, which are also secured together. Such relative pivoting movement can be seen to be transmitted through the ring member 18, which is constructed and arranged between these two relatively moving sets of elements.

In order to eliminate many of the frictional forces which are normally created in the hinged joint, and to prolong the life expectancy of ring member 18, clearances are provided between the outwardly facing wall portions of the bushing and the ring member and inwardly facing wall portions of the link 12 and the ring member. Thus, the ring member is constructed and arranged to maintain contact only with the sleeve members in order to reduce frictional forces and prolong the life thereof.

A seal and coupling assembly forming apparatus 20, as shown in FIG. 2, will now be described. A tapered die member 21 is adapted to receive and form a seal and coupling sub-assembly. The lower bore portion 22 prescribes the final dimension for the assembly. The die member may be secured to an apertured support plate 23 by bolts 24.

A split plunger 26 comprises a plurality of expanded finger members 27 which are formed in an expanded, bifurcated fashion, as illustrated. The plunger preferably comprises a hardened steel constituent which will assure sufficient resiliency to the finger members thereof to permit their collapse into the die member during the forming process. A shank 28 may be operatively connected to a suitable press to aid in the actuation of the plunger. In most forming applications, sufficient force may be imparted to the sub-assembly to simultaneously urge all parts thereof into the die member by extending the circumferentially extending lower surface portions 29 of the plunger only over the sleeve 17. However, surface portions 29 may be constructed to extend over the sleeve 16, if so desired.

In operation, the ring member 18 is positioned between the sleeve members 16 and 17 to thus form a pre-assembly on a substantially common longitudinal axis X—X. As above stated, the ring member may be bonded by conventional bonding techniques to one or both of the sleeve members, if so desired. However, in many applications such a bonding step may not be desired. As above stated, indentations preferably of a concave configuration may be preformed on the exposed surface portions 18a of the ring member to assure subsequent expansion thereof into substantially flush relationship with the edge portions of sleeve 17.

The pre-assembly is then thrust in a downward direction along axis X—X, as viewed in FIG. 2, to force the sleeve 17 inwardly in the direction of axis Y—Y, towards the inner sleeve 16 to compress the ring member 18 therebetween and expand surface portions 18a into substantial flush relationship with the edges of sleeve 17. The ring member is radially loaded in a sufficient manner to allow maximum required rotational flexing to occur in its desired environment without detrimentally placing the ring member in a state of tensile stress. Due to the forming steps, little if any compression is afforded to the ring member in the direction of axis X—X. Attention is particularly directed to FIG. 3 wherein it is shown that limited relative rotational movements between the sleeves through a typical range of angles of from 15° to 35°, functions to cause a flexing of the ring member 18 which is arranged in secured and coupling relationship therebetween. It can thus be seen that primarily due to the fact that the ring member 18 is in compression, it may be prevented from being put into tensile stress due to torsion.

The finger members 27 of the swaging tool 26 are designed to collapse sufficiently to finally urge the pre-assembly into the forming portion 22 to thus shape the sleeve 17 into a desired configuration. Thus a precisely toleranced seal and coupling assembly may be economically and efficiently made to permit subsequent installation thereof into an appropriate arrangement such as the endless track mechanism environment of FIG. 1.

I claim:
1. A hinged joint comprising a first pivotal link, a second pivotal link constructed and arranged adjacent to said first pivotal link to extend away therefrom, a pivot pin secured to said second pivotal link, a bushing rotatably mounted on said pivot pin and secured to said first pivotal link, said first and second pivotal links, an end portion of said bushing and said pivot pin constructed and arranged to form a substantially closed annular chamber, a seal and coupling assembly arranged in said annular chamber, said seal and coupling assembly comprising a first sleeve member secured to said pivot pin and arranged in thrust bearing abutting relationship between said second pivotal link and said bushing, a second sleeve member secured to said first pivotal link and arranged at predetermined distances from said second pivotal link and said bushing, respectively, and an elastic means constructed and arranged under radial compression between said first and second sleeve members for permitting a selected relative clockwise or counter-clockwise of at least 15° rotational movement therebetween before subjecting said elastic means to tensional forces.

2. The invention of claim 1 wherein said elastic means is constructed and arranged at predetermined distances from said second pivotal link and said bushing, respectively, to prevent the creation of frictional forces when there is relative movement therebetween.

3. A hinged joint according to claim 1 wherein said elastic means is bonded to at least one of said sleeves.

References Cited by the Examiner
UNITED STATES PATENTS

| | | | |
|---|---|---|---|
| 2,061,223 | 11/1936 | Cunningham et al. | 305—11 |
| 2,517,429 | 8/1950 | Henning | 305—42 |
| 2,598,115 | 5/1952 | Dodge | 287—85 |
| 2,699,974 | 1/1955 | Deffenbough | 305—11 |
| 2,738,236 | 3/1956 | Haushalter | 305—42 X |
| 2,906,562 | 9/1959 | Burgman | 305—11 |
| 2,911,840 | 11/1959 | Muller et al. | 305—11 X |

FOREIGN PATENTS

| | | |
|---|---|---|
| 365,604 | 1/1932 | Great Britain. |
| 621,355 | 4/1949 | Great Britain. |

ARTHUR L. LA POINT, *Primary Examiner.*